United States Patent [19]
Martin et al.

[11] Patent Number: 5,466,185
[45] Date of Patent: Nov. 14, 1995

[54] REMOVING BREAST MEAT FROM POULTRY

[75] Inventors: Eugene Martin, Denver; Scott Cook, Strasburg, both of Pa.

[73] Assignee: Foodcraft Equipment Company, Lancaster, Pa.

[21] Appl. No.: 286,238

[22] Filed: Aug. 8, 1994

[51] Int. Cl.[6] ........................................ A22C 21/00
[52] U.S. Cl. ............................... 452/165; 452/166
[58] Field of Search ................... 452/165, 169, 452/166, 136

[56] References Cited

U.S. PATENT DOCUMENTS

| | | |
|---|---|---|
| 4,023,237 | 5/1977 | Meyn . |
| 4,155,146 | 5/1979 | Meyn . |
| 4,207,653 | 6/1980 | Gasbarro . |
| 4,503,587 | 11/1984 | Martin . |
| 4,558,490 | 12/1985 | Hazenbroek et al. . |
| 4,563,791 | 1/1986 | Martin et al. . |
| 4,597,136 | 7/1986 | Hazenbroek . |
| 4,648,155 | 3/1987 | Burnett . |
| 4,648,156 | 3/1987 | Meyn . |
| 4,651,383 | 3/1987 | van der Eerden . |
| 4,769,872 | 9/1988 | Hazenbroek et al. . |
| 4,780,930 | 11/1988 | Sparkia ............... 452/165 |
| 4,873,746 | 10/1989 | Scheier et al. . |
| 4,920,610 | 5/1990 | Callsen et al. . |
| 4,937,918 | 7/1990 | Martin . |
| 4,993,114 | 2/1991 | Meyer et al. . |
| 4,993,115 | 2/1991 | Hazenbroek . |
| 5,083,974 | 1/1992 | Martin et al. . |
| 5,176,564 | 1/1993 | Hazenbroek . |
| 5,183,434 | 2/1993 | Scheier et al. ............... 452/169 |
| 5,199,922 | 4/1993 | Korenberg et al. . |
| 5,269,722 | 12/1993 | Diesing et al. . |
| 5,312,291 | 5/1994 | van den Nieuwelaar et al. . |
| 5,314,374 | 5/1994 | Koch et al. . |
| 5,368,520 | 11/1994 | Koch et al. . |

*Primary Examiner*—Willis Little
*Attorney, Agent, or Firm*—Shoemaker and Mattare, Ltd.

[57] ABSTRACT

Breast meat is stripped from a poultry carcass, after the shoulder joints have been separated and preliminary cuts have been made in the shoulder area with a cutter designed to leave the wings attached to the breast meat, by pulling the wings and breast meat attached thereto downward on the carcass. The breast fillets and wings remain attached to the carcass, facilitating visual inspection of the product. An apparatus for performing this method comprises special devices operating at four successive stations of an inline machine; the inspection is done at a fifth station.

23 Claims, 9 Drawing Sheets

REMOVING BREAST MEAT FROM POULTRY

BACKGROUND OF THE INVENTION

This invention relates generally to butchering and particularly to a device for removing breast meat from poultry.

Foodcraft Equipment Company, and several other manufacturers, produce machinery which automates many of the tedious cutting chores once done by hand. One task now receiving attention, because of the premium prices fetched by boneless breasts, is that of producing breast fillets, intact and undamaged.

One popular method of removing breast meat is to pull or peel the meat off the rib cage, rather than cutting it. This is done, after partially separating the shoulder joints, by pulling the wings away from the rib cage, drawing the breast meat with them. Certain preparatory cuts have to be made to free the breast meat partially from the carcass, and to sever the shoulder joint ligaments while allowing the wings to remain tied to the breast meat by flesh and certain tendons. The present invention performs these and other functions.

Some producers would prefer to have the breast meat (mainly the muscle pectoralis major) pulled down on the rib cage, but not totally removed, pending a visual inspection of the product. Of course, they would also prefer to maximize yields by reliably avoiding the bone slivers that can result from cutting with a sharp blade, and by harvesting other minor muscles in the vicinity of the breast, such as the "eye" muscle serratus anterior. This invention provides special devices and methods for achieving these goals.

SUMMARY OF THE INVENTION

An object of the invention is to initiate removal of breast meat from a carcass, without fully removing the breast meat or wings, to facilitate inspection of the product.

Another object of the invention is to minimize bone chip production while producing breast fillets.

A further object of the invention is to maximize yields by minimizing the amount of meat left on the carcass during automatic filleting.

These and other objects are attained by placing a poultry carcass on an upwardly oriented fixture which fits within the rib cage, with the back of the carcass facing a downstream direction, tilting the fixture forward so that the breast faces obliquely upward, then moving the fixture toward a pair of spaced stationary jaws having beveled edges. The jaws engage the carcass behind the shoulder joints, and, while a biasing spring tends to keep the fixture tilted, it tilts back upward when a predetermined resistance, sufficient to overcome the bias, is encountered. As a consequence, the shoulder joints rotate to locate the jaws accurately at the joints. Now, with the fixture again erect, curved movable jaws, each having a pointed tip, is pivoted downward around the front of the joint toward the stationary jaw. Now the beveled edges wedge on both jaws wedge the joint apart, rather than cutting it apart. The wings remain connected to the breasts, so that the wings can be pulled downward with respect to the carcass, to peel the breast meat from the rib cage.

A machine for carrying out the method comprises a series of fixtures, each adapted to fit within the rib cage of a carcass, means for moving the fixtures along a predetermined path, a shoulder cutting device for separating the shoulder joints and a portion of the tissues surrounding the joints, while leaving each wing attached to the breast meat, and means for peeling the breast meat from the rib cage by pulling the partially severed wings downward along the rib cage. The shoulder cutting device includes a pair of stationary jaws, means for positioning the stationary jaws in the path of the respective shoulder joints of carcasses mounted on the fixtures, means for tilting the fixtures towards the stationary jaws as they approach, and biasing means tending to keep the fixtures tilted, as they advance toward the jaws, until resistance from the stationary jaws is sufficient to overcome the biasing means, a pair of curved movable jaws, each mounted for pivoting movement relative to a respective stationary jaw, each movable jaw having a pointed tip for penetrating tissue, and a beveled edge for wedging a respective shoulder joint apart as the jaws are closed, means for pivoting the movable jaws relative to the stationary jaws to separate the joints, and means for withdrawing the jaws from the joints following separation.

Term definition

As used herein, "carcass" means a portion of a dressed bird from which the internal organs, head, neck, pelvis, thighs and legs have been removed. The wings are initially attached to the carcass.

"Longitudinal" means a horizontal direction along the length of the conveyor, or parallel to that length. "Transverse" is a horizontal direction perpendicular to longitudinal.

"Downstream" is the longitudinal direction in which the product moves; "upstream" is the opposite. The "leading" edge of a component is the edge facing the downstream direction; "trailing" is the opposite. The "distal" end of an elongate member is its free end; "proximal" is the opposite.

Any item described as "stationary" is affixed to the machine frame, even though the connection may not be described.

"Yaw", "pitch" and "roll" are used in the aeronautic sense, to describe rotational movements of the carcass supporting fixtures about vertical, transverse and longitudinal axes, respectively.

"UHMW" is an acronym for ultra-high molecular weight.

All other words are intended to have their ordinary meanings.

BRIEF DESCRIPTION OF THE DRAWINGS

In the accompanying drawings.

DESCRIPTION OF THE PREFERRED EMBODIMENT

Figure 1:
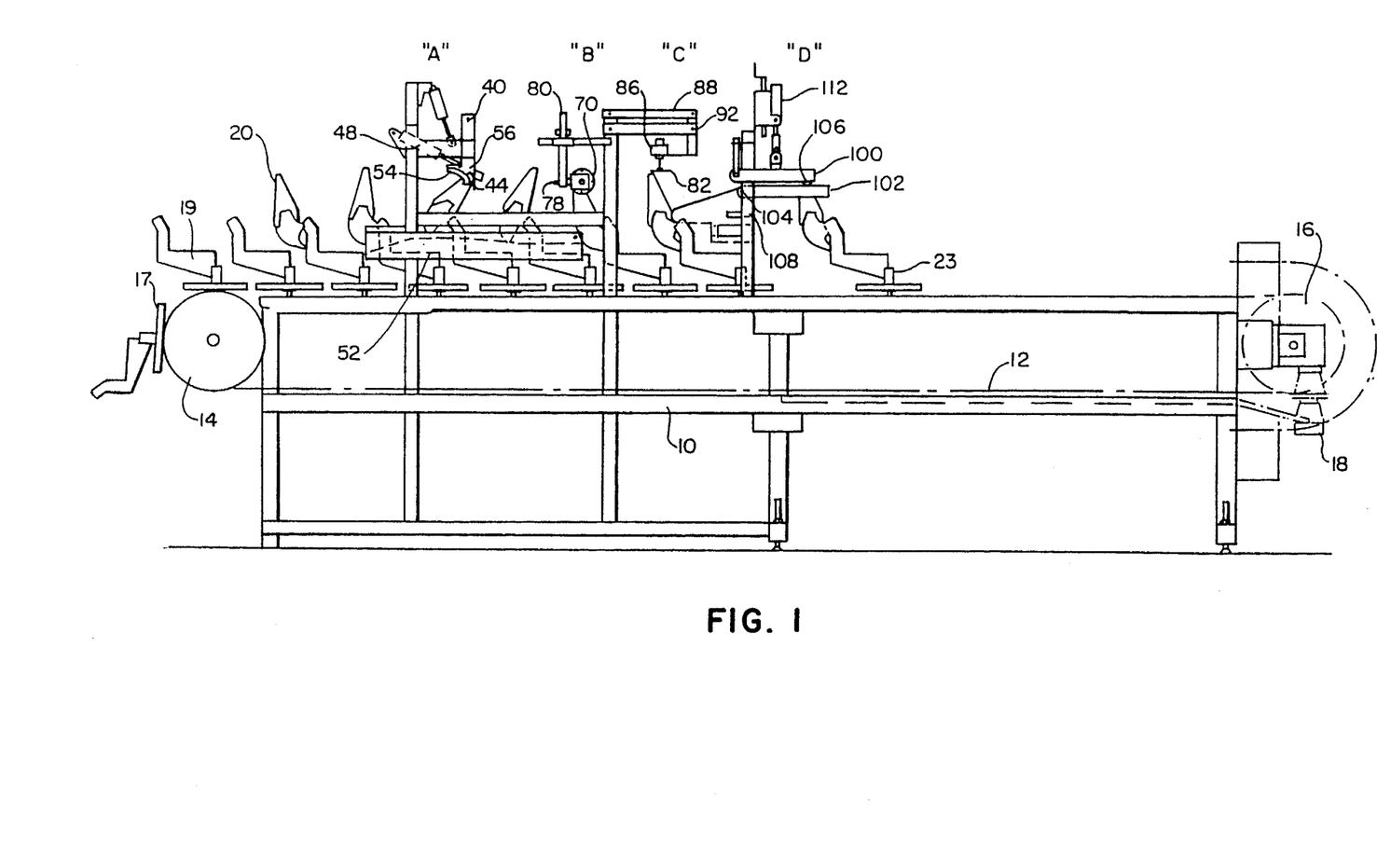
FIG. 1 is a side elevation of a machine for partially removing breast meat from a poultry carcass.
Figure 2:
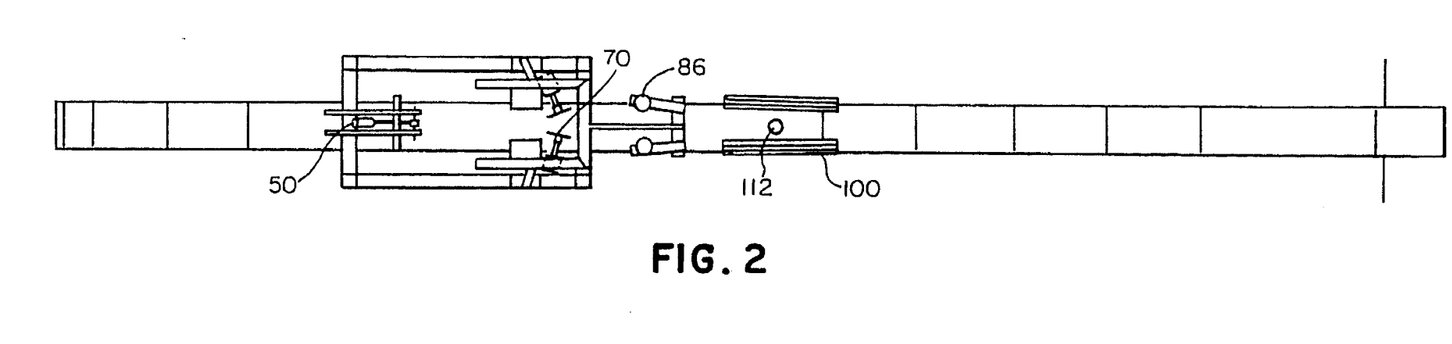
FIG. 2 is a partial top plan view thereof.

As seen in FIGS. 1 and 2, a machine for partially removing breast meat from poultry includes a frame 10, only a portion of which is shown, supporting four successive devices A,B,C,D spaced along and above a loop of conveyor chain 12 running on sprockets 14,16 at either end of the machine. The downstream sprocket 16 is driven intermittently by a motor 18 as illustrated, or alternatively, by a power take off unit driven from another machine. In the latter case, if the input to the power take off unit is continuous, an device for producing intermittent motion, such as a Geneva drive, must be used.

A series of UHMW guide plates 17 are affixed to the outside of the chain loop, at equal intervals, so that they ride above the chain along the upper portion of the loop. To keep the guide plates from wobbling, their upper outer longitudinal edges are rabbeted; the rabbets receive and slide below the upper flanges of respective stationary channel members 19 on either side of the conveyor.

Carcass Fixtures

A carcass supporting fixture 20 is connected to each guide plate by means of a bracket arm 21. The arm is welded to a short vertical shaft 23 at its lower end, which is pivotally received in the guide plate 17. The vertical shaft extends through a bearing plate 25, to which it is welded. Two plastic wheels 27, one attached to the bottom of the bracket arm, and the other affixed to the bearing plate, serve to oscillate the arm about the axis of the vertical shaft, as described further below.

The fixtures 20 themselves are similar to those used on a number of prior devices. One is shown in detail in FIG. 3. The shape is basically frustoconical, but modified in accordance with avian anatomy, to fit within the thorax. The preferred material for the fixture is UHMW polyethylene. The groove 22 in the leading face is designed to receive the backbone.

Figure 3:
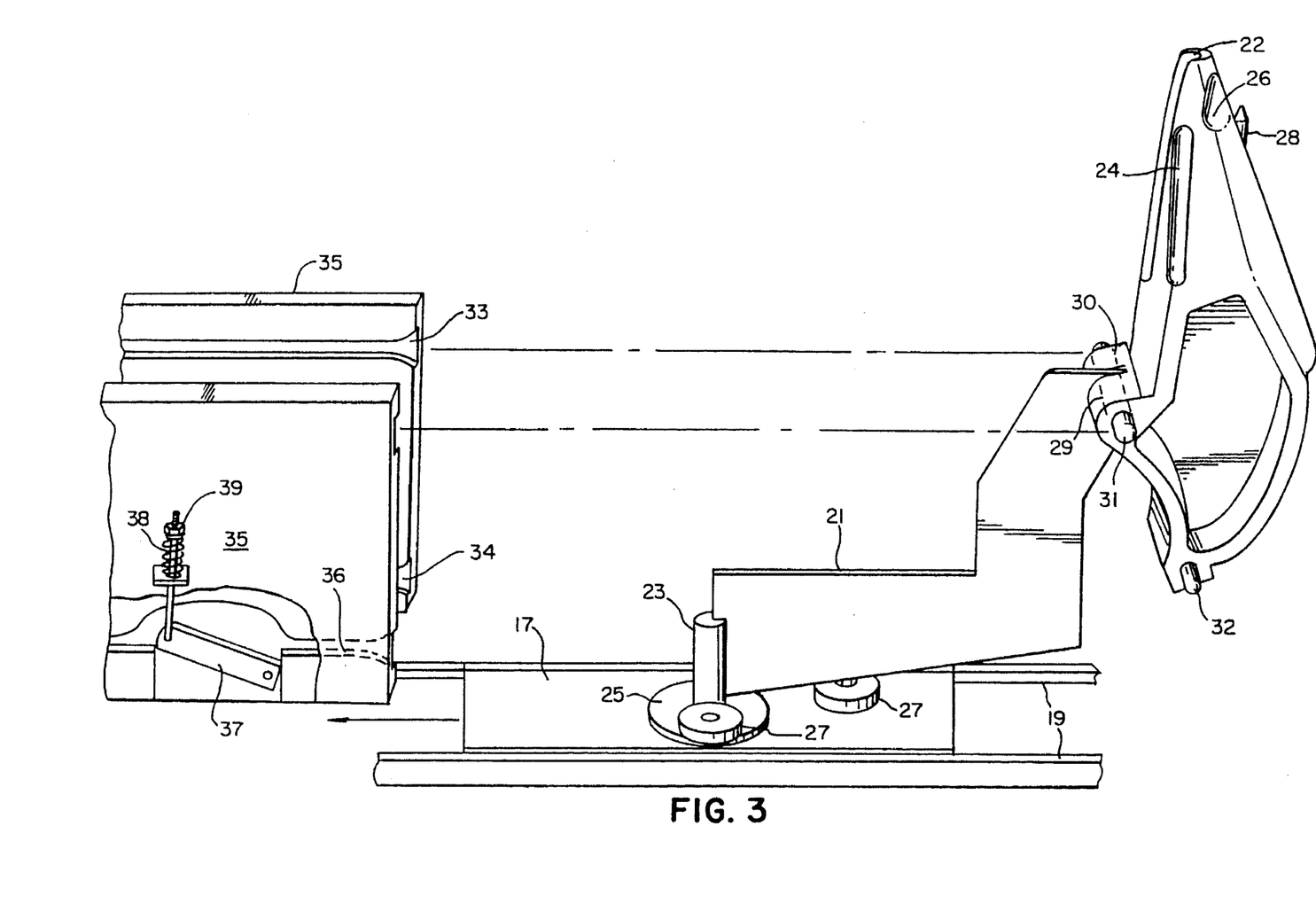
FIG. 3 is a perspective view of a fixture for supporting a carcass.

The recesses 24,26 on the leading and trailing sides are new to this application. They provide clearance for the blades of the scapula scraper and wishbone scraper, respectively.

The pointed dowel 28 is new, as well. It is intended to limit downward movement of the carcass onto the fixture by engaging the interior of the sternum. A conically pointed dowel was used initially, but the presently preferred tip shape is substantially that of a paraboloid, that is, rounded. Each dowel is pressed or screwed into a hole drilled into the trailing face of the fixture, along an axis parallel to the backbone groove. Plural holes may be provided to allow for dowel relocation when bird size changes.

The upper end of the bracket arm is secured in a slot 30 in the fixture by a horizontal shaft 29 which extends through the fixture and acts a hinge pin, its rounded tips 31 protruding to either side. Rearward tilting is limited by contact between the bottom of the fixture and the leading edge of the bracket arm. Inasmuch as the fixture can pivot about the horizontal shaft 29, and the bracket arm can rotate about the vertical shaft 23, the fixture is capable of universal movement, which facilitates inspection and cleaning, and also provides maximum versatility for development of other processing modules.

It is important for the fixture position and attitude (inclination) to be precise with respect to the cutting implements. So, to stabilize the fixture at the first four stations, its four pins 31,32 enter into and slide along grooves 33,34 formed in stationary plastic side plates 35 disposed above the channel members 19. The grooves are widened at their entrances to receive the pins 31,32 which initially may be somewhat out of alignment. Beyond the entrances, the grooves narrow to confine the pins closely, thus preventing the fixtures from tilting forward (pitching). Additionally, the side plates 35 closely confine the sides of the fixtures themselves, keeping the fixture from yawing or rolling.

The fixtures 20, moving in intermittent fashion, carry a series of carcasses through the four devices, dwelling at each for a brief time sufficient to permit completion of special butchering steps. The "carcass" referred to has by now been gutted, and the lower half, comprising the pelvis, thigh and legs, has been removed. The carcass has been loaded onto a fixture manually, or automatically, so that the fixture seats within the now-empty thorax, with the backbone in the vertical groove. The dowel, engaging the sternum, prevents the machinery from destroying the rib cage by forcing it down too far on the fixture. The carcass is now precisely positioned, so that the cutting implements have a known and fixed target.

The shoulder cutting device "A" separates the shoulder joint, without severing it completely, leaving the wings attached to the large breast muscles, pectoralis major. The second device "B" scrapes the scapula, pushing meat above the scapula down the carcass, away from the shoulder. The third device "C" is a wishbone scraper that also pushes meat down, away from the shoulder. At the fourth station "D", the wings are pulled down along the carcass, peeling the breast meat from the rib cage, but leaving it attached at the bottom, so that an inspector at station "E" can verify the absence of broken ribs and other problems, before the breast meat is actually removed. This speeds up and improves inspection. The various devices are described in detail below.

Shoulder Cutting Device

The shoulder cutting device comprises a support bracket 40 having a pivot connection to the frame 10. The bracket is raised or lowered by a double-acting pneumatic cylinder 42 fixed at its top end to the frame, and at its lower end to the bracket. The position shown in FIG. 1 is a lowered position ready to receive a carcass, with the fixed jaw 44 of a scissors-type cutter in the path of the carcass, and the movable jaw 46 fully raised by a second double-acting cylinder 48. The respective cutters have spring mountings 50 that enable the cutters to move or "float" laterally somewhat, independent of each other.

Attention is again directed to the side plates 35, whose grooves 33,34 receive the four fixture pins 31,32 to steady the fixture. The upper grooves 33 are of constant width and height above the conveyor, because the shaft 29 and the pins 31 formed at its end cannot move vertically. Obviously, the spacing between the grooves determines the inclination of the fixtures, which have a normal forward rake of about 10°.

There is a need to tilt the fixtures forward temporarily at the first station. This movement is accomplished by effectively increasing the height of a portion of the floor 36 of the lower groove. A segment of the side plate 35 is cut away around the lower groove at this location. Here, the groove's floor is replaced with a ramp segment 37 which can float in its opening, and is biased upwardly by a compression spring 38. Spring preload can be varied by turning a nut 39 on the shaft about which the spring is mounted, and whose lower end is attached to the ramp. The ceiling of the lower groove is raised above the ramp, by enlarging the groove, to allow the pins to ride up over the ramp. As they do so, the fixture tips forward. But, should the fixture encounter sufficient resistance (and it will), it can force the ramp down, level with the remainder of the floor of the groove. The side plates and ramps are symmetrical on either side of the center plane.

The ramps tilt the fixtures forward (in the downstream direction) at an angle of about 50° from vertical, as they approach station "A". Since the carcass is oriented with its back facing downstream, the breast now faces substantially upward and the shoulders are well exposed.

The shoulder cutter is initially lowered so that its fixed jaws 44 are in the path of the shoulders, and the movable jaws are raised up out of the path. Entry ramps 54, formed at the front of the jaws, depress the shoulders, aligning them level with the working edge 56 of the fixed jaw. The jaw is beveled at an angle of about 25° on the inner side, down to a dull edge about 1/32 inch wide not intended to cut the flesh. The working edge terminates at a protruding tooth or point 58, which hooks underneath the shoulder.

As the carcass is moved further by the fixture, the working edge 56 bears against the rear of each shoulder with increasing force, until the force is sufficient to overcome the forward tilting bias provided by the springs. Then, as the fixture tilts backward towards vertical, the shoulders rotate a partial turn (about 50°) against the fixed jaws, around an axis passing through both shoulders, and this movement helps work each jaw edge into the joint. The idea is to wedge the joint apart, breaking the connecting ligaments, without using a sharp edge which could produce bone slivers.

The fixed jaws are deliberately set up initially slightly inboard of the target joints. Since each jaw is beveled inside only, it tends to move laterally outward as it presses into the flesh; this slight traversing motion better locates the joints. The brackets 40 has a loose pivot mounting at 59 to the frame, and there is a spring connection between the brackets, so that they can float laterally, independently, while the fixed jaws "find" each shoulder joint.

The wings at this point are held up, about horizontal, by guide rods 52, so that the flat end of the shoulder ball (actually, an ellipsoid) is about vertical.

After the fixture has been tilted backward to nearly vertical by the resistance of the fixed jaws, the movable jaws 46 are actuated. The fixed and movable jaws together have the appearance of a scissors, but they are not simply shears. The sharply pointed tip 60 of each movable jaw first pierces the skin on the pectoral side of the shoulder. See FIGS. 4A and 4B. As the jaw closes, it curls around and under the joint, which by now has been accurately located by the fixed jaw. Next, the double-beveled segment 62 wedges the joint apart from the front, rather than cutting through it, while the fixed jaw applies a separating force from the rear. There is no shearing by the double-beveled segment. Nearer the pivot point 66, the movable jaw has a sharp-edged segment 64, which shears the tendons and any skin in its path as the jaw approaches the end of its travel. The cylinder 48 then is operated to open the jaw, allowing for release of the shoulder.

Figure 4A:
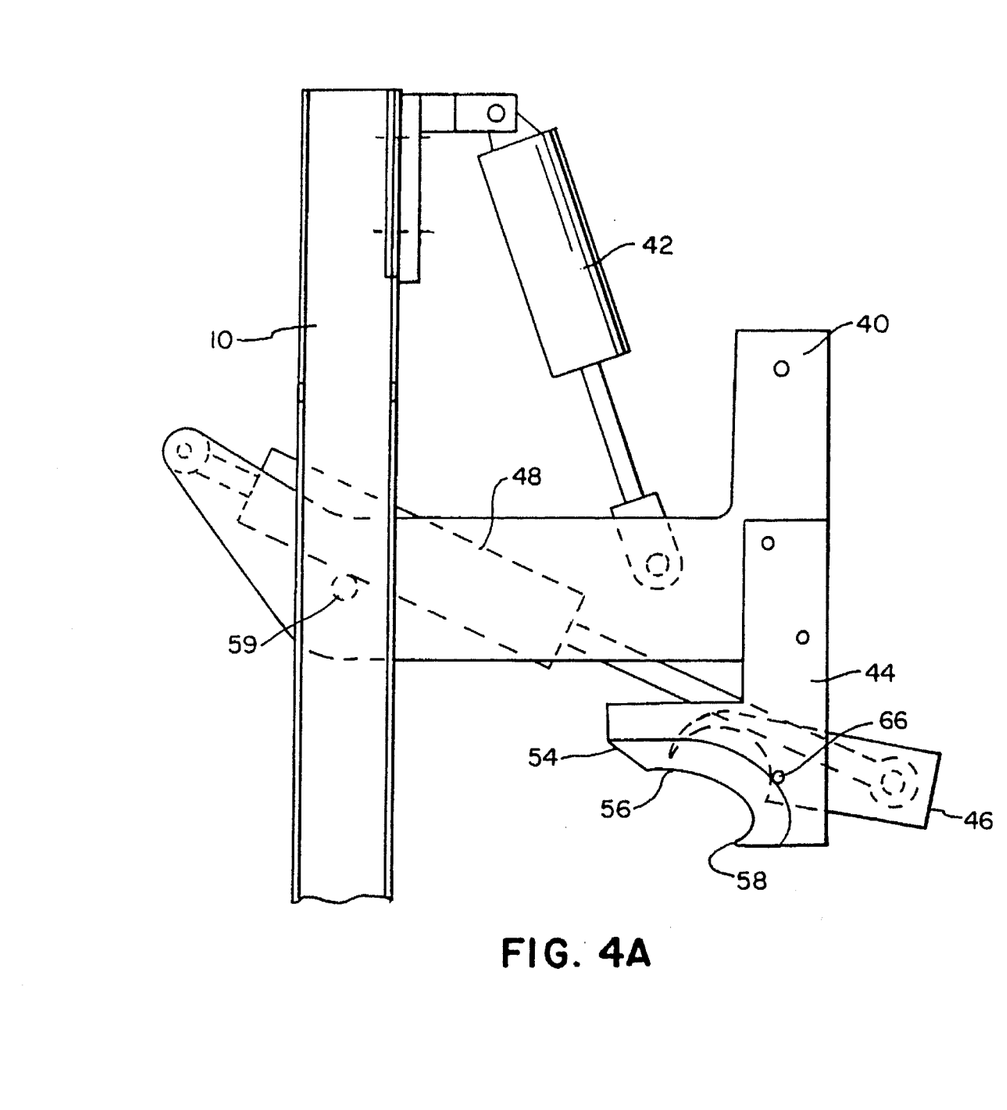
FIG. 4A is a simplified view of a shoulder cutting device, as seen looking away from the center plane of the machine.
Figure 4B:
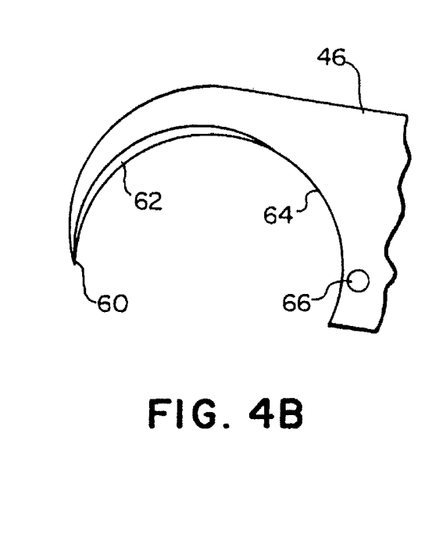
FIG. 4B is an enlarged view of the movable blade in FIG. 4A.

The dimensions of the movable jaw are such that the jaw, while severing the joint, does not remove the wing from the breast. That is, the radius of the jaw is sufficient to encircle the joint proper, but not all the flesh surrounding it, and particularly not the tendons which connect the wings to the breasts. It is important that the wings have a strong connection to the breast meat, so that they can be used to peel the meat from the rib cage. The tendons connecting the wings to the "eye" muscles at the side of the rib cage should also remain unsevered.

The support bracket 40 is raised by a pneumatic cylinder 42 after the joints are severed, following retraction of the movable jaws 46. The same cylinder 42 is preferably used also to apply some downward force to the bracket during the cutting step. Optimization of the downward force should be a matter of ordinary skill.

After the fixture leaves station "A", the pins 32 clear the ramps, and the grooves 33,34 again narrow to closely confine them and prevent further pitching. The fixture is thereafter is held almost vertical as it moves along through the next three stations.

Scapula Scrapers

The device at "B" (FIGS. 5A and 5B) comprises a pair of rotary scapula scrapers, one on either side of the machine, each comprising a small air motor 72 affixed to a bracket 74. The bracket extends in a generally transverse direction; its outer end is affixed to a horizontal, pivotable shaft 78, which in turn is supported by a vertical shaft 80. The bracket 74 extends slightly beyond the horizontal shaft, where the bracket is joined to the piston rod of a double-acting pneumatic cylinder 79 whose upper end is fixed to the frame. Extension of the cylinder raises the motor 72 along an arc (FIG. 5B) lying in a plane perpendicular to the length of the machine, to a "ready" position.

Figure 5A:
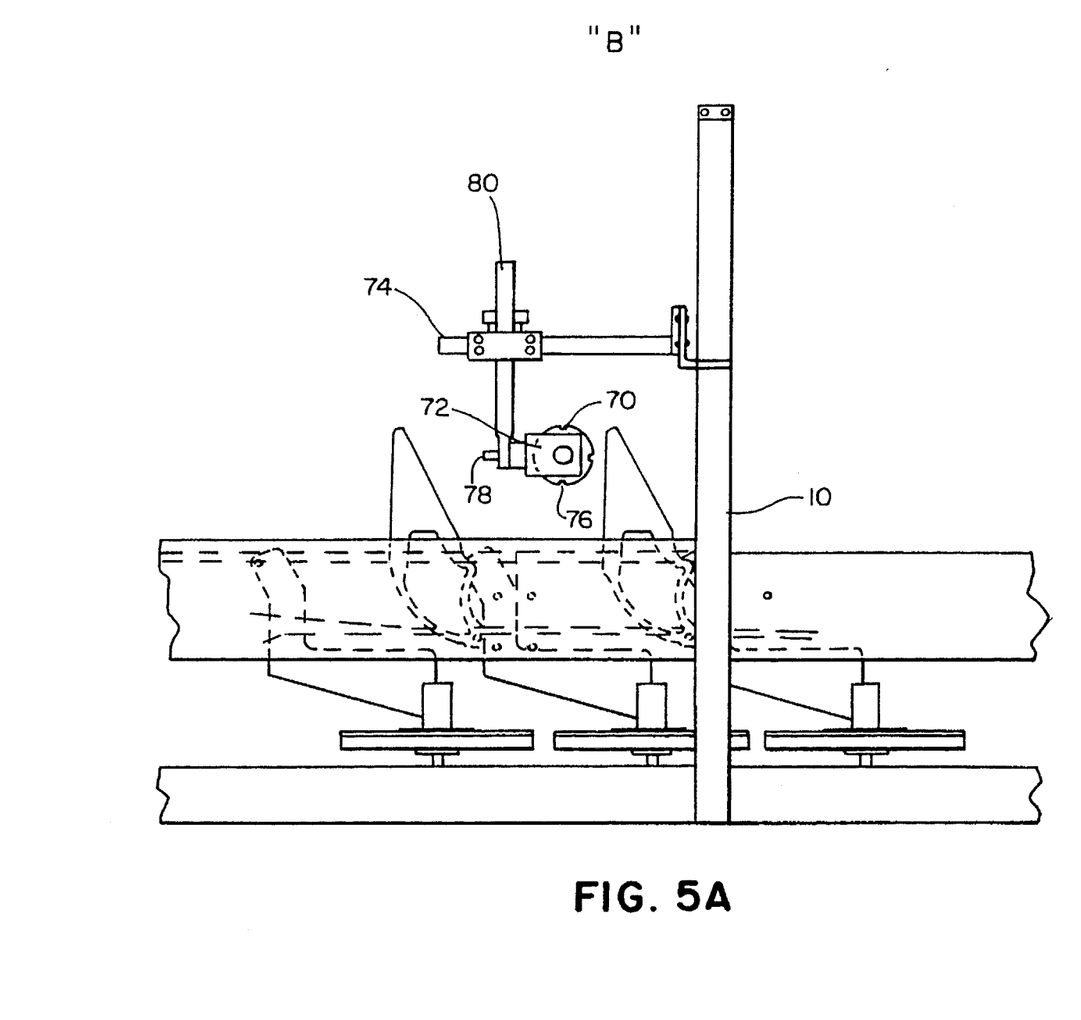
FIG. 5A is a side elevation of a scapula scraping device.
Figure 5B:
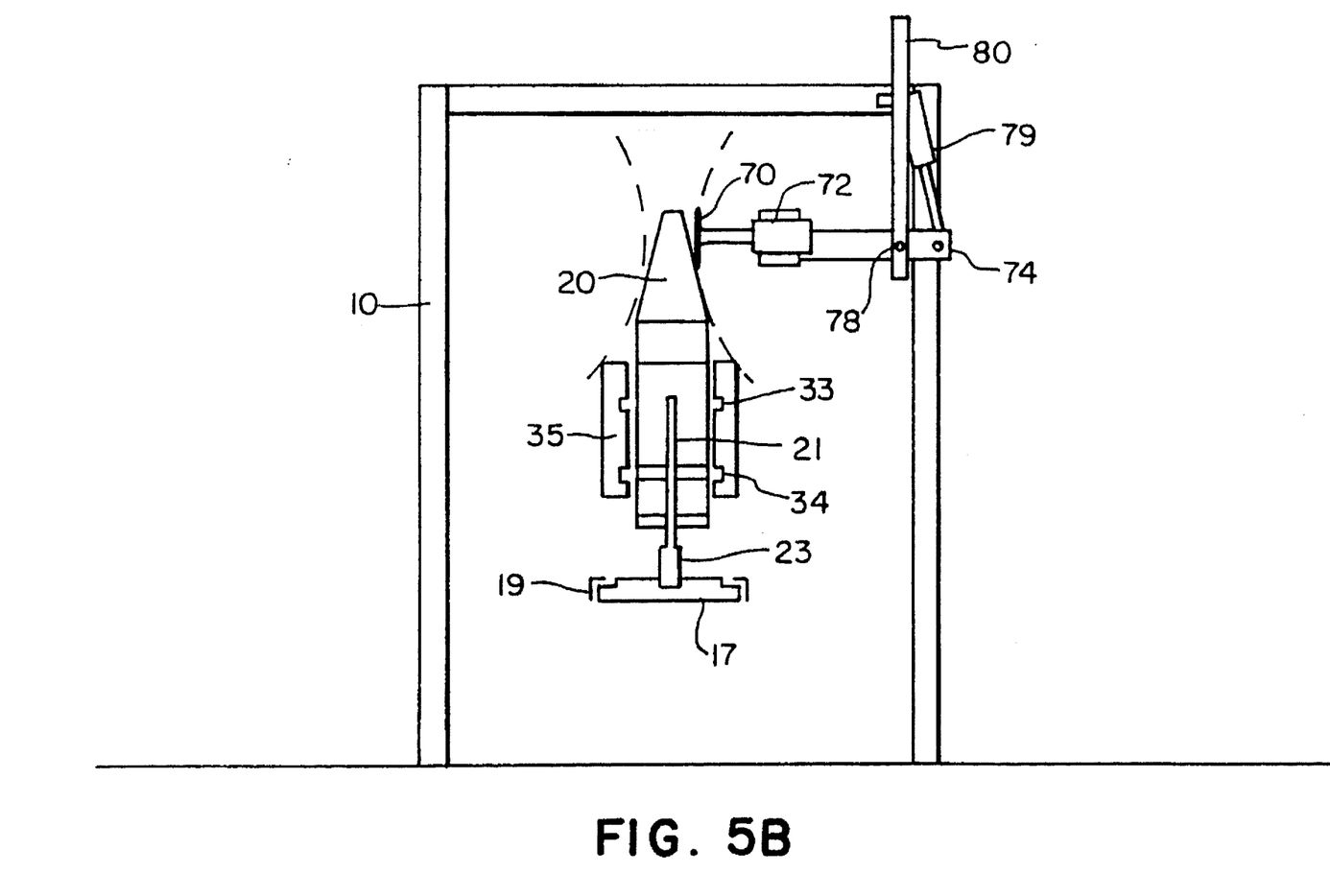
FIG. 5B is an end view thereof, looking downstream.

In its rest position, the horizonal shaft 78 runs in the longitudinal direction. Springs normally bias the vertical shafts so as to move the motors in the upstream direction; however, the vertical shaft can yield when the carcass is engaged. That is, the scrapers are biased toward the back of the carcass, but can yield outward and downstream as they are driven down by retraction of the cylinders 79. The rate of blade descent is controlled by a variable restrictor (not shown) in the air line leading to the cylinder 79.

Each blade 70 is beveled on one side only, and is made of Celcon (Celanese Corporation's trade name for a family of acetal copolymers), which is not hard enough to cut bone and thus avoids chip production. It is rotated, only on its downstroke, by the air motor in a direction such that its leading edge moves downward, so as to push meat down the carcass. Four peripheral slots 76 in the blade enhance its cutting effect.

Wishbone Scrapers

The tips of the wishbone, where they meet the shoulders, are particularly fragile. The two wishbone scrapers at "C" (FIG. 6) are designed to prevent the tips from being broken. Their working members 82 are made of ultra-high molecular weight (UHMW) polyethylene, and have the appearance of a narrow-brimmed top hat whose peripheral rim 84 is rounded, not sharp. Also driven by intermittently its own air motor 86, the direction of rotation of each wishbone scraper is such that its downstream edge turns inward (i.e., toward the sternum), drawing the shoulder meat toward the breast as it disengages the tip of the breast meat in the valleys between the wishbone (furculum) and the side of the sternum and between the upper end of the wishbone and the shoulder socket.

Figure 6:
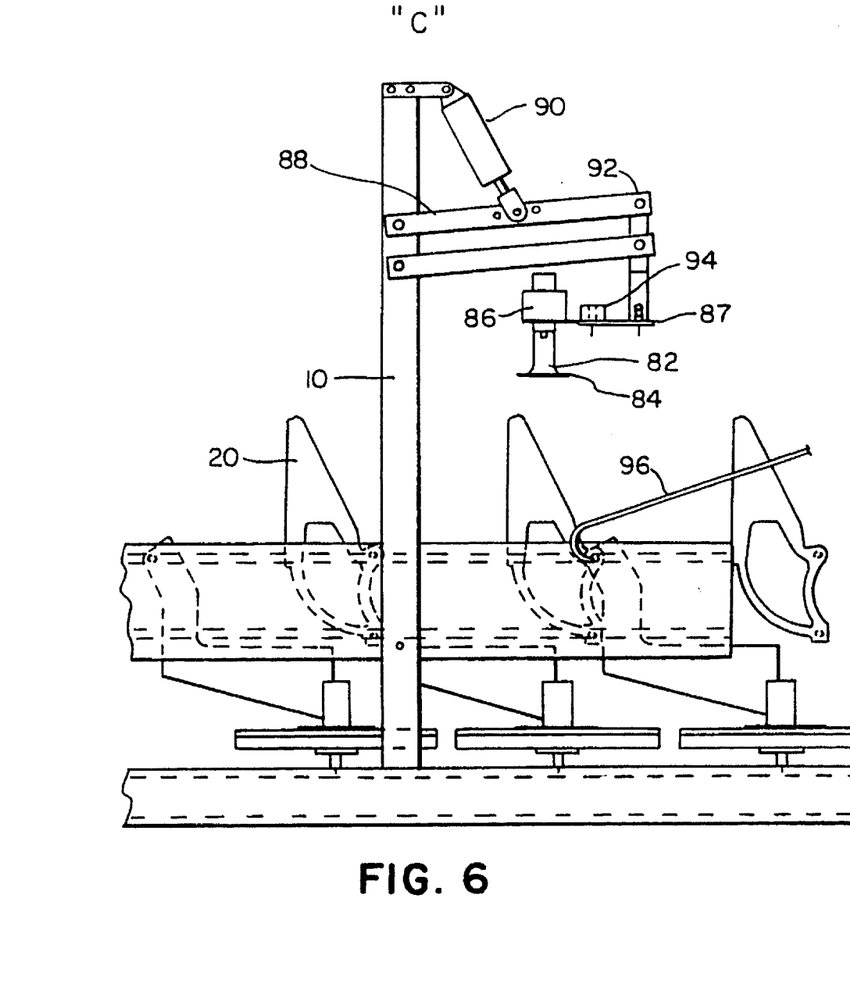
FIG. 6 is a side elevation of a wishbone scraper.
Figure 7:
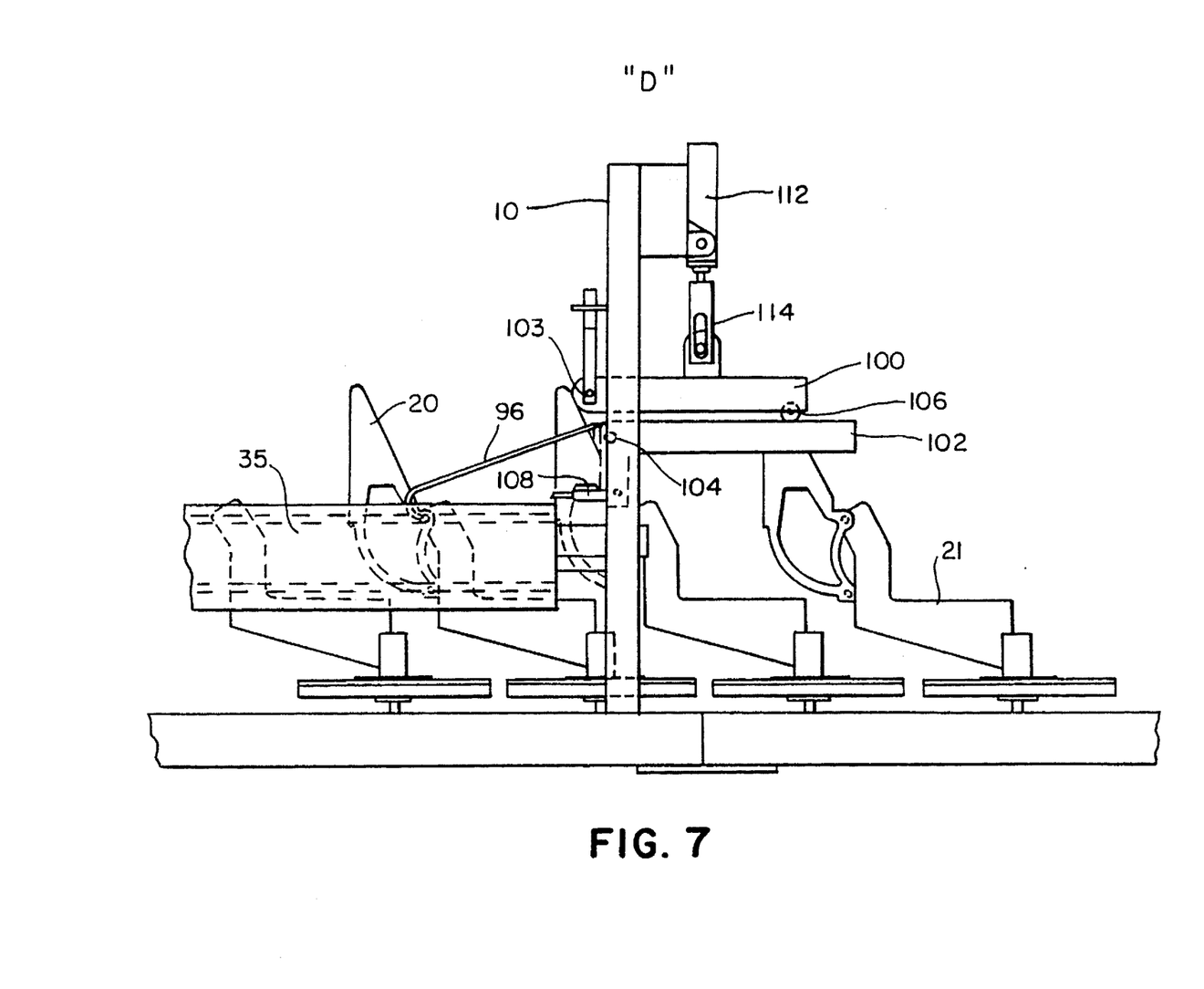
FIG. 7 is a side elevation of a wing pulling device.

The air motors are supported on respective bars 87 pivotally connected to a platform that in turn is suspended from the end of a four-bar linkage 88 which keeps the motor shafts almost vertical as they move up and down. Springs (not shown) between the bars bias the scrapers toward one another; a rotatable elliptical cam 94 disposed between the bars limits their inward movement. By turning the cam, one can adjust the scraper spacing, so that the scrapers first engage the shoulders just outboard of the tips of the wishbone.

The pivot connection 92 at the distal end of the upper bar is a pin-in-slot connection, with the slot running lengthwise of the upper bar, to let the platform pitch somewhat as it descends, so that it can follow the wishbone contour. The linkage is raised by an air cylinder 90 while the fixtures are moving, and is lowered during the dwell period to scrape flesh from the wishbone. The motors are active only during the latter period. J-shaped quarter-inch diameter guide rods 96 reengage beneath the wings at the wishbone scraper, to prepare for the wing pulling station.

Wing Puller

At the wing pulling station "D" (FIG. 8), there are two pairs of parallel bars 100,102, each having a pivot mounting (103,104 respectively) to the frame. Each upper bar actually comprises a pair of spaced members straddling the respective lower bar; the members are separated at their distal ends by a spacer 106 which normally abuts the top edge of the lower bar. The spacer keeps the upper and lower bars approximately parallel, and separated by a distance slightly greater that the thickness of the upper wing segment. The wings are led into the gap between the bars by the guide rods 96 mentioned above.

Figure 8:
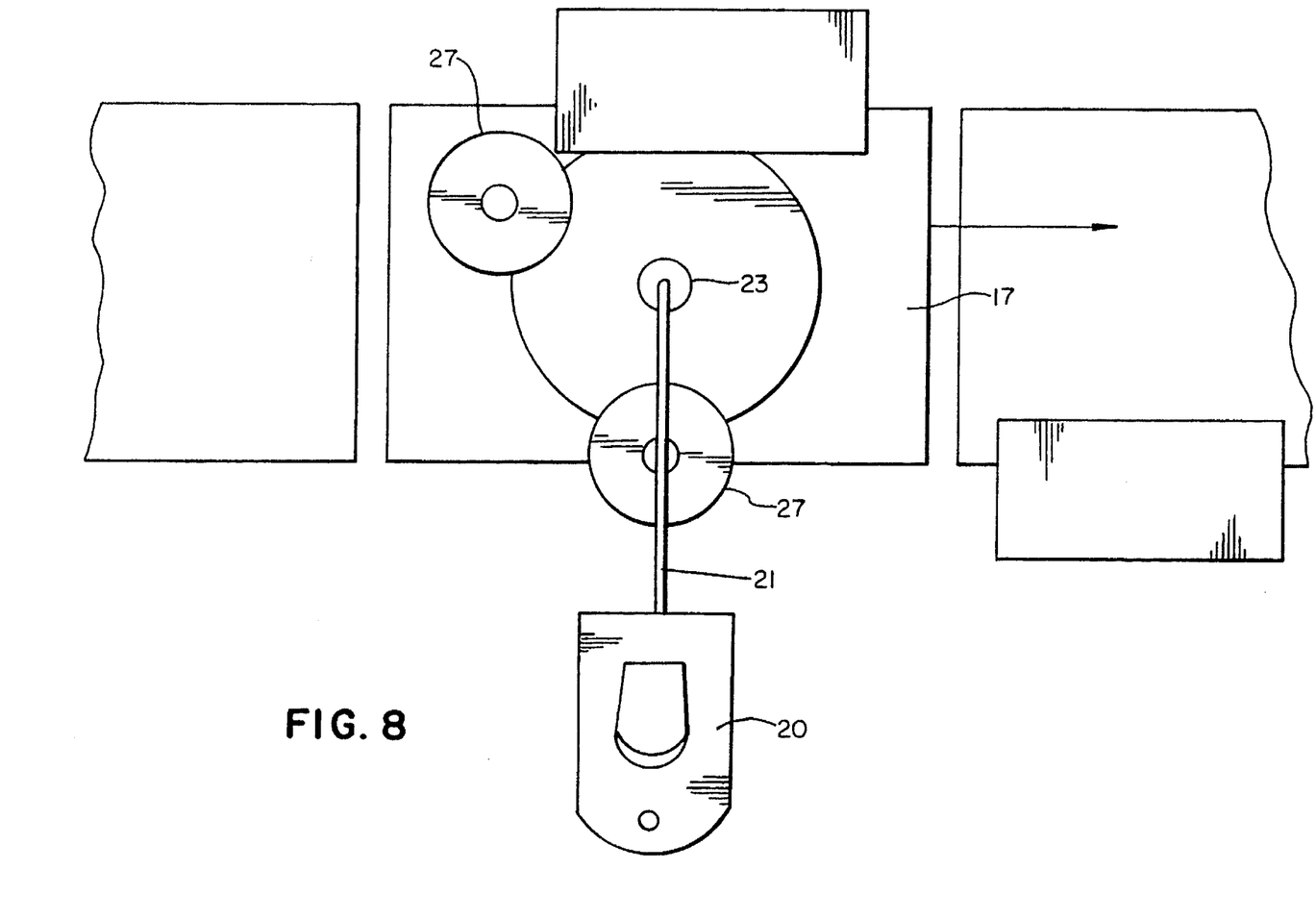
FIG. 8 is a plan view of an inspection station.

A small air cylinder 108 applies an upward biasing force to the lower bar, but this force is overcome when the upper bar is lowered.

The upper bar is pivoted up or down by an air cylinder 112 having a common lost-motion attachment 114 to both upper bars. In its uppermost position, each bar is about horizontal, ready to receive the wings of an approaching bird. Once the wings are between the bars, movement of the fixture is temporarily arrested, and the pneumatic cylinder 112 is caused to extend, pivoting the upper bars, and indirectly the lower bars, downward. Because they are initially horizontal, the upper bars apply a purely downward force to the wings at first. But with added displacement, the pulling force has an increasing horizontal component, which helps pull the breast meat (pectoralis major, along with the eye muscles, serratus anterior, but not the tenderloins, pectoralis minor) away from the thorax.

The wings are pulled enough to expose the rib cage, but not so far as to remove the breast fillets entirely. The breast meat remains attached to the carcass at the bottom, at least by the hypocledial ligament.

Finally, the upper bars are raised, permitting the humeri to escape.

The various motions produced by the air cylinders described above are synchronized by conventional controls not described in detail, responsive to a position sensor associated with the conveyor chain. As the chain reaches a dwell position, it stops, and the various operations are performed automatically, before chain movement resumes.

Inspection Station

Beyond the peeling station, the fixture, no longer restrained by the side plates 35, is rotated manually 90° about its vertical axis as the downstream wheel strikes a stationary block on the left side of the conveyor, as seen in FIG. 9. Alternatively, the block can be driven upstream on cue by a linear motor of some kind.

The reorientation places the carcass in a convenient position for an inspector standing to one side of the line. The product is inspected for broken bones, foreign matter and the like, before the breast fillet is severed from the carcass and transferred to a modular machine (not shown) which cuts the wings from the breast meat. The tenderloins, remaining with the carcass, are removed by a separate module, not shown, further downstream, after the fixtures have been returned to their initial orientation by the interaction between the upstream wheel and a second block to the right of the conveyor.

Since the invention is subject to modifications and variations, it is intended that the foregoing description and the accompanying drawings shall be interpreted as illustrative of only one form of the invention, whose scope is to be measured by the following claims.

I claim:

1. A machine for partially removing breast meat from a poultry carcass, comprising a series of fixtures, each adapted to fit within the rib cage of a carcass, means for moving the fixtures along a predetermined path, a shoulder cutting device for separating the shoulder joints and a portion of the tissues surrounding the joints, while leaving each wing attached to the breast meat, and means for peeling the breast meat from the rib cage by pulling the partially severed wings downward along the rib cage, the shoulder cutting device including:

a pair of stationary jaws, means for positioning the stationary jaws in the path of the respective shoulder joints of carcasses mounted on the fixtures, a pair of curved movable jaws, each mounted for pivoting movement relative to a respective stationary jaw, each movable jaw having a beveled edge for wedging a respective shoulder joint apart as the jaws are closed, means for pivoting the movable jaws relative to the stationary jaws to separate the joints, and means for withdrawing the jaws from the joints following separation.

2. The invention of claim 1, wherein the shoulder cutting devices are supported relative to the fixtures by a suspension that allows the devices to move laterally, independently of one another, to locate the shoulder joints exactly before the jaws are closed.

3. The invention of claim 1, wherein each movable jaw has a pointed tip for penetrating flesh in its path as it closes.

4. The invention of claim 1, wherein each movable jaw has a sharp edge portion for cutting tissues around the joint after the joint has been separated.

5. The invention of claim 1, wherein each stationary jaw has an edge beveled at about 25°, for working into the joint as the carcass is forced against it by the fixture, the edge being dulled so as not to cut flesh between the jaw and the joint.

6. The invention of claim 5, wherein the bevel on each stationary jaw is formed on one side of the jaw only, and the beveled sides of the stationary jaws face one another so that the jaws are forced apart slightly by engagement with the carcass.

7. The invention of claim 5, wherein each stationary jaw has a protruding lower edge which hooks under the joint.

8. The invention of claim 5, wherein each stationary jaw has a flat dull edge about 1/32" wide.

9. The invention of claim 1, wherein the withdrawing means comprises a supporting bracket and means for raising the bracket with respect to the fixtures.

10. The invention of claim 1, further comprising means for scraping flesh in the vicinity of the scapula down the carcass prior to the peeling means.

11. The invention of claim 10, wherein the scapula scraping means comprises a pair of rotary blades made of a polymeric material, one blade in the vicinity of either scapula, and means for moving the blades substantially vertically along the respective scapulae.

12. The invention of claim 1, further comprising means for pushing flesh in the vicinity of the wishbone down the carcass from the shoulders prior to the peeling means.

13. The invention of claim 12, wherein the pushing means comprises a pair of rotary, hat-shaped polymeric blades with a dull rims, and means for moving the blades substantially vertically along the arms of the wishbone.

14. The invention of claim 1, wherein the peeling means comprises two pairs of bars, each pair comprising a lower bar and an upper bar above the lower bar, both movable between an upper position and a lower position, means for leading the humerus of each wing between a respective upper and lower bar when the bars are in their upper position, means for biasing each lower bar upward against the wing, and means for driving each upper bar downward toward their lower position, to pull the wings and the breast meat toward the bottom of the carcass.

15. The invention of claim 14, where each of the bars has a pivot connection at its upstream end to a stationary support, and each bar is substantially horizontal in its upper position, whereby the bars follow an arc as they are driven downward, thereby pulling the wings away from the rib cage.

16. The invention of claim 1, wherein the means for moving the fixtures comprises an endless chain driven along a predetermined path, a series of guide plates affixed to the chain, a bracket arm having a vertical pivot connection to each guide plate, and a horizontal pivot connection to a respective fixture, and further comprising both means for controlling vertical pivoting of the bracket arm with respect to the guide plate, and means for tilting the fixture with respect to the bracket arm.

17. The invention of claim 16, wherein each fixture has a pivot axis and a pair of pins protruding laterally along an axis parallel to the pivot axis, the machine comprises a pair of side plates astride the path of the fixture, each side plate having a longitudinally extending groove for receiving and guiding a respective one of said pins, and the tilting means comprises a ramp within said groove for changing the effective elevation of the groove over the length of the ramp.

18. A method of partially removing breast meat from a poultry carcass, comprising steps of placing the carcass on an upwardly oriented fixture which fits within the rib cage, with the back of the carcass facing a predetermined horizontal direction, tilting said fixture in said direction so that the breast faces obliquely upward, then moving the fixture toward a pair of spaced stationary jaws having beveled edges, the jaws being disposed so as to engage the carcass behind the shoulder joints, then continuing to move the fixture while applying a bias tending to keep the fixture tilted, yet allowing it to tilt back upward when a predetermined resistance, sufficient to overcome the bias, is encountered, whereby the shoulder joints rotate against the stationary jaws to locate the jaws at the joints, then pivoting a curved movable jaw having a pointed tip downward around the front of the joint toward the stationary jaw, said movable jaw having a beveled edge, whereby said tip penetrates tissues in front of the joint and the beveled edges then wedge the joint apart, then cutting a portion of the tissues around the joints without severing all of the tissues connecting the wings to the breasts, and then pulling the wings downward with respect to the carcass, thereby peeling the breast meat from the rib cage.

19. The invention of claim 18, wherein the pulling step is terminated while a portion of the breast meat is still attached to the rib cage, so that the product can be visually inspected intact.

20. The invention of claim 18, wherein only a portion of the curved movable jaw has a sharp edge for performing the cutting step.

21. The invention of claim 18, further comprising a step of scraping tissues in the vicinity of the scapula downward, away from the shoulder, by means of a blade passed downward over the scapula, the scraping step being performed after the cutting step and before the pulling step.

22. The invention of claim 18, further comprising a step of pushing tissues in the vicinity of the wishbone downward, away from the shoulder, by means of a dull-edged blade passed downward over the wishbone, the pushing step being performed after the cutting step and before the pulling step.

23. The invention of claim 18, wherein the pulling step comprises capturing the upper segment of each wing, and pulling first straight downward on the segment, and then pulling progressively away from the breast side of the carcass.

* * * * *